UNITED STATES PATENT OFFICE.

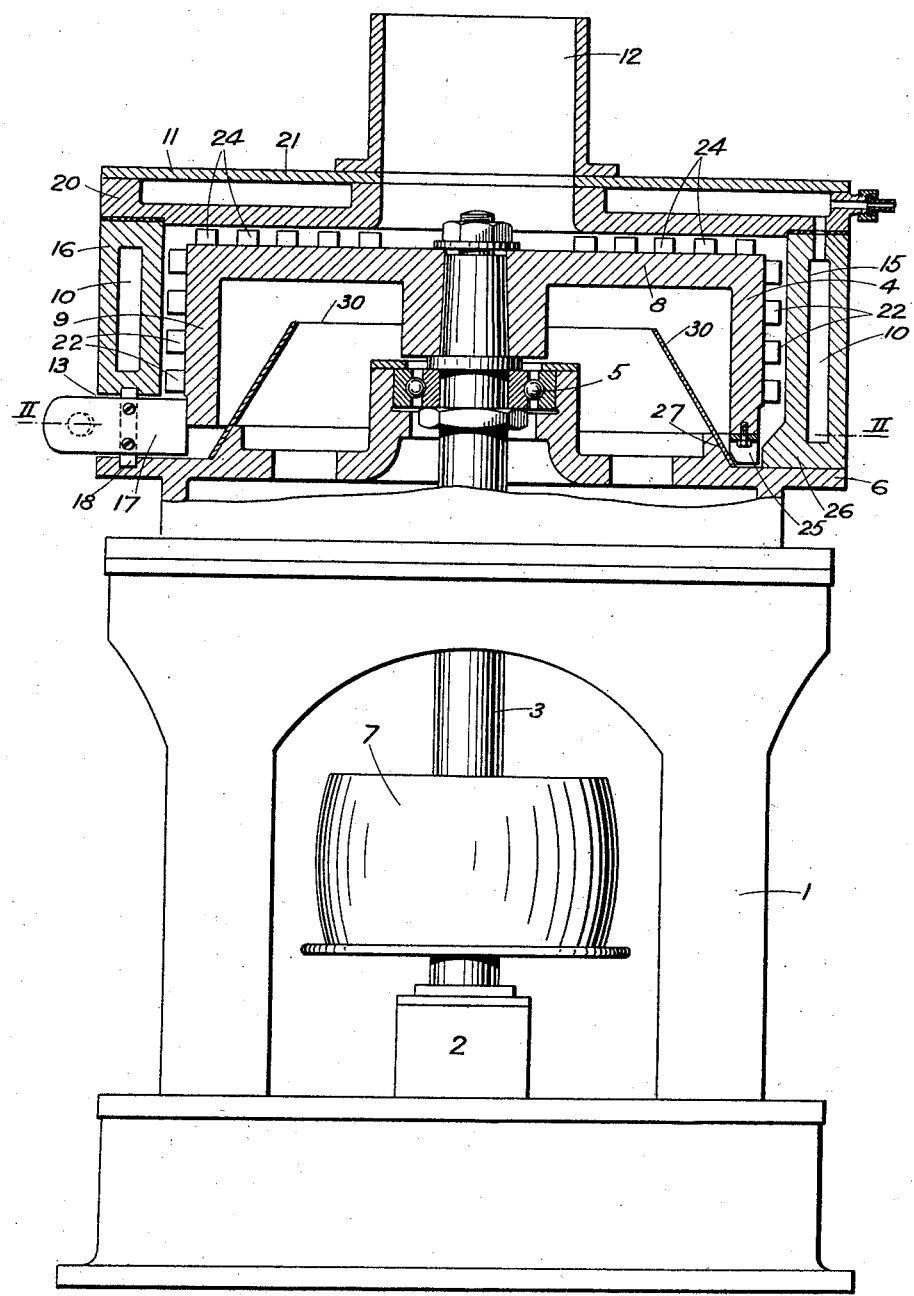

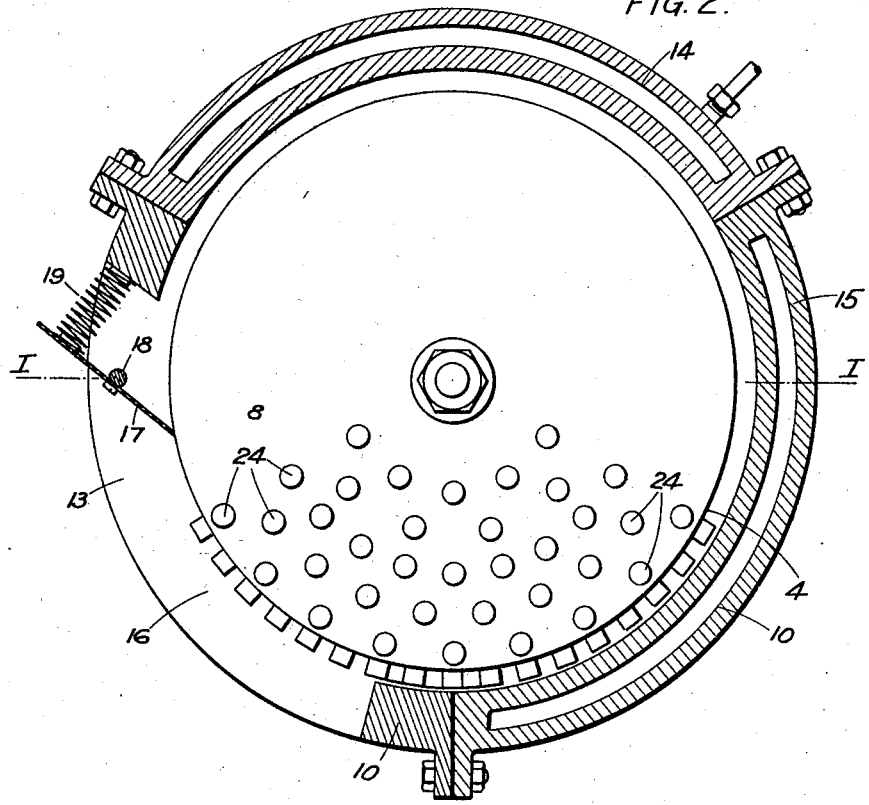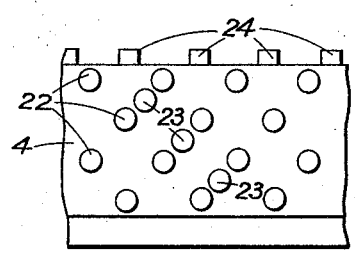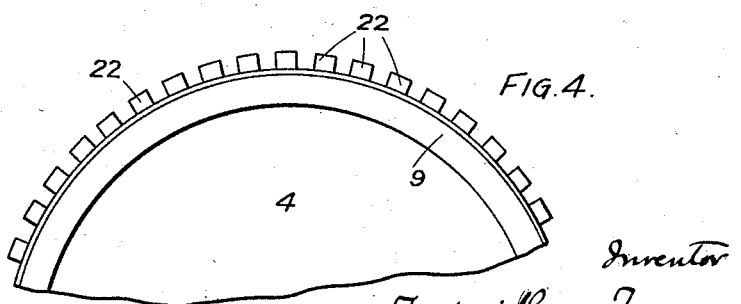

FREDERICK GEORGE FRYER, OF YORK, ENGLAND.

BEATING OR THRESHING MACHINE.

1,387,380.  Specification of Letters Patent.  Patented Aug. 9, 1921.

Application filed July 27, 1920. Serial No. 399,439.

*To all whom it may concern:*

Be it known that I, FREDERICK GEORGE FRYER, a subject of the King of the United Kingdom of Great Britain and Ireland, residing at 9 St. Peter's Grove, York, England, have invented certain new and useful Improvements in and Relating to Beating or Threshing Machines, (for which I have filed an application in Great Britain, July 25, 1919,) of which the following is a specification.

This invention relates to improvements in threshing machines, beaters and the like for threshing or beating, preferably in the presence of air, liquids in a state of fine subdivision, and more particularly but not exclusively for threshing, preferably in the presence of air, mixtures of cocoa liquor, sugar and other ingredients, for instance, flavoring materials and cocoa butter, in the manufacture of high class " fondant " chocolate and similar chocolates of a smooth consistency.

The type of machine to which the invention relates comprises a high speed rotor and a stator, and the space in which threshing occurs is constituted by the clearance space between said rotor and stator through which clearance space the material to be treated is passed and in which there operate blades, pins, projections or the like threshing or beating members, which are secured on the rotor.

Now the present invention comprises several improvements, the first of which consists in employing a rotor and stator in the case of each of which those surfaces which bound the clearance space in which the threshing occurs comprise a plane horizontal surface and a cylindrical or conical surface or surface of revolution at the periphery of the former the axis of rotation of which cylindrical or conical surface or surface of revolution is vertical and situated at the center of the plane surface, the plane and cylindrical or conical surfaces or surface of revolution of the rotor being at a short distance from the plane and cylindrical or conical surfaces or surface of revolution, respectively, of the stator.

The second improvement is appendant to the first and consists in the provision on the stator of separate jackets for its plane and cylindrical or conical surfaces or surface of revolution.

The third improvement is appendant to the first and consists in the presence of one or more scrapers located on the lower edge of the rotor and arranged almost to make contact with the upper surface of the base of the stator in order that material collecting in its or their path of rotation may be swept toward the outlet from the clearance space. Such scrapers, *per se*, are not claimed to be new.

A threshing machine according to the present invention is illustrated by way of example in the accompanying drawings in which:—

Figure 1 is a side elevation of the machine partly in section on the line I—I Fig. 2.

Fig. 2 a plan partly sectional on the line II—II Fig. 1, the cover plate 11 and inlet member 12 being removed, Fig. 3 the side elevation of a portion of the rotor, and Fig. 4 an under-plan of a portion of the rotor of the machine.

In said drawings 1 is the cylindrical pedestal of the machine in the base of which the step-bearing 2 is provided for the vertical shaft 3 at the upper end of which the rotor 4 is mounted. Immediately below said rotor the shaft is journaled, by means of a ball bearing 5, in the base 6 of the stator, outer casing or cylinder within which the rotor runs, said base being bolted to the top of the pedestal. For driving purposes the lower end of the shaft is furnished with the belt pulley 7.

The body of the rotor 4 comprises essentially an upper horizontal disk 8 and a cylindrical wall 9 integral therewith while the stator, outer casing or cylinder within which the rotor runs comprises the aforesaid base 6, the cylindrical wall 10 and the annular cover plate 11 with a central inlet orifice for the material to be treated. The latter plate is provided with the inlet member 12 which serves to guide the material or mixture to be treated through the central inlet orifice in the cover plate. In the lower edge of the cylindrical wall 10 the outlet 13 for the mixture is provided, this outlet being of a height extending from the upper surface of the base 6 to a short distance above the lower edge of the rotor and being of a length extending about 90° around the wall. The cylindrical wall is composed of three arc-shaped castings 14, 15, 16, the first two of which are similar to one another and are hollow in order if desired to serve as heat jackets. The third casting is also hollow for the same purpose but is recessed for the purpose of forming the outlet 13. The latter outlet serves for the reception of the scraper 17 which is mounted on the pivot pin 18 which engages at its upper end in a recess in the casting 16 and at its lower end in the base 6. The outer end of the said scraper 17 is subjected to the pressure of the helical spring 19 which bears at one end against said scraper and at the other against the casting 16. The aforesaid cover plate 11 consists of a lower annular dished casting 20 and an upper flat annulus 21 bolted thereto. The space inclosed between said members enables the cover plate when desired to be used as a heat jacket.

The clearance space between the upper disk 8 of the rotor and the lower casting 20 of the cover plate is comparatively small as illustrated, as also is the clearance space between the cylindrical wall 9 of the rotor and the cylindrical wall 10 of the outer casing and in said clearance spaces there operate pins which are fixed in the rotor. The rotor wall 9 is provided (see Figs. 1 and 3) with four circumferential rows of pins 22, each row containing twenty four pins and there are also provided between these rows extra pins 23 (shown only in Fig. 3), there being four of such pins between adjacent rows. The upper disk 8 of the rotor is fitted with five circular rows of pins 24. The arrangement and the number of the pins may of course be varied widely as desired.

It will be understood that when the rotor is set in rapid motion and the mixture introduced into the inlet sleeve 12 the said mixture is thoroughly threshed by said pins 24, 22, 23 during its passage through the aforesaid clearance spaces on its way to the outlet 13. In order to aid the material operated upon to reach the outlet 13 and positively to displace material collected on the base 6 of the lower edge of the rotor wall 9 is provided with a scraper 25. Said scraper 25 for the greater part of its travel operates in a trough-shaped space located laterally between a projecting abutment 26 at the inner lower part of the cylindrical wall and a truncated conical wall 30 fixed to a somewhat similar projecting abutment 27 on the base 6, and said scraper just clears the base 6. Said abutment 26 and the wall 30 are provided with inclined surfaces which direct the material operated upon into the course of said scraper and hence the latter serves continually to drive the material toward the outlet. The wall 30 also serves to prevent any of the material from escaping inward within the hollow rotor and reaching the bearing 5.

What I claim is:—

1. In a machine for beating liquids, a rotor having an upper horizontal surface and a peripheral surface of revolution, a stator surrounding the rotor and defining therewith a narrow space, projections on the said surfaces of the rotor extending substantially across the whole width of said space, means defining an inlet and an outlet for said space and means for rapidly revolving the rotor.

2. In a machine for beating liquids, a rotor having an upper horizontal surface and a peripheral surface of revolution, a stator surrounding the rotor and defining therewith a narrow space, projections on the said surfaces of the rotor, means on the stator defining a water jacket surrounding the said space, an inlet and an outlet for said space and means for rapidly revolving the rotor.

3. In a machine for beating liquids, a rotor having an upper horizontal surface and peripheral surface of revolution, a stator surrounding the rotor and defining therewith a narrow space, projections on the said surfaces of the rotor extending substantially across the whole width of said space, scraping means on the lower surface of the rotor extending in proximity to the adjacent surface of the stator, means defining an inlet and an outlet for said space, and means for rapidly revolving the rotor.

4. In a machine for beating liquids, a rotor having an upper horizontally disposed disk-like member and a peripheral flange portion extending downwardly therefrom, a stator surrounding the rotor and defining therewith a narrow space, projections on the upper and on the peripheral surface of the rotor extending substantially across the whole width of said space, means on the stator defining a groove below the lower edge of the flange portion of the rotor, scraping means on the lower edge of said flange portion extending into said groove in proximity to the bottom thereof, means defining an inlet through the upper part of the stator and an outlet through the lower part of the stator and means for rapidly revolving the rotor.

5. In a machine for beating liquids, a rotor having an upper horizontally disposed disk-like member and a peripheral flange portion extending downwardly therefrom, a stator surrounding the rotor and defining therewith a narrow space, projections on the upper and on the peripheral surface of the rotor extending substantially across the whole width of said space, means on the stator defining an upwardly and outwardly widening groove below the lower edge of the flange portion of the rotor, a shield member extending upwardly and inwardly from the inner wall of said groove, scraping means on the lower edge of the flange portion extending into said groove in proximity to the bottom thereof, means defining an inlet through the upper part of the stator and an outlet through the lower part of the stator and means for rapidly revolving the rotor.

6. In a machine for beating mixtures of cocoa liquor, sugar and other ingredients, a rotor having an upper horizontal surface and a peripheral surface of revolution, a stator surrounding the rotor and defining with said surfaces a narrow space, stout projections on the surface of the rotor extending substantially across the whole width of said space, means defining an inlet and an outlet for said space and means for rapidly revolving the rotor.

In testimony whereof I affix my signature in the presence of two witnesses.

FREDERICK GEORGE FRYER.

Witnesses:
 ARNOLD S. ROUNTREE,
 OSCAR F. ROUNTREE.